US012592075B2

(12) United States Patent
Rentz et al.

(10) Patent No.: US 12,592,075 B2
(45) Date of Patent: Mar. 31, 2026

(54) REMOTE SENSING FOR INTELLIGENT VEGETATION TRIM PREDICTION

(71) Applicant: FLORIDA POWER & LIGHT COMPANY, Juno Beach, FL (US)

(72) Inventors: Iliana M. Rentz, West Palm Beach, FL (US); Steve T. Jolly, Palm Beach Gardens, FL (US); Barry Lynn Grubb, St. Petersburg, FL (US); Isaac Bentolila, West Palm Beach, FL (US)

(73) Assignee: Florida Power & Light Company, Juno Beach, FL (US)

( * ) Notice: Subject to any disclaimer, the term of this patent is extended or adjusted under 35 U.S.C. 154(b) by 286 days.

(21) Appl. No.: 17/956,175

(22) Filed: Sep. 29, 2022

(65) Prior Publication Data

US 2024/0112462 A1 Apr. 4, 2024

(51) Int. Cl.
| | |
|---|---|
| *G16H 30/40* | (2018.01) |
| *G01S 17/89* | (2020.01) |
| *G06N 20/00* | (2019.01) |
| *G06V 10/764* | (2022.01) |
| *G06V 20/10* | (2022.01) |
| *G16H 50/20* | (2018.01) |

(52) U.S. Cl.
CPC ............ *G06V 20/188* (2022.01); *G01S 17/89* (2013.01); *G06V 10/764* (2022.01)

(58) Field of Classification Search
CPC .... G06V 20/188; G06V 10/764; G01S 17/89; G01S 7/4802; G01S 7/4808; G01S 17/42; G01S 17/88
See application file for complete search history.

(56) References Cited

U.S. PATENT DOCUMENTS

| | | | |
|---|---|---|---|
| 11,074,447 B1 | 7/2021 | Fox et al. | |
| 11,483,981 B1 * | 11/2022 | Lo .......................... | A01G 31/06 |
| 2010/0198775 A1 * | 8/2010 | Rousselle ............ | A01B 79/005 |
| | | | 706/54 |

(Continued)

OTHER PUBLICATIONS

Chen, et al.: "Early Detection of Tree Encroachment in High Voltage Powerline Corridor Using Growth Model and UAV-Borne LiDAR"; pp. 1 to 13, esp pp. 1 to 8, fig. 2-8.

(Continued)

*Primary Examiner* — Siamak Harandi
*Assistant Examiner* — Mehrazul Islam
(74) *Attorney, Agent, or Firm* — Fish & Richardson P.C.

(57) ABSTRACT

A system for predicting vegetation encroachment into a utility asset that includes a remote sensing controller that stores a set of 3D data characterizing a utility asset and vegetation in a digital twin database. The digital twin database stores 3D data characterizing the utility asset and vegetation over time. The system further includes a biomass engine that classifies instances of vegetation characterized by the set 3D data stored in the digital twin database as a particular type of vegetation. The biomass engine further generates a growth curve for each instance of vegetation based on the set of 3D data stored in the digital twin database and the particular type of vegetation. Additionally, the biomass engine predicts future growth for each instance of vegetation based on the growth curve and determines if and when each instance of vegetation will exceed an encroachment threshold associated with the utility asset.

16 Claims, 6 Drawing Sheets

(56)         References Cited

U.S. PATENT DOCUMENTS

| 2018/0098137 | A1  | 4/2018 | Saha |             |
|--------------|-----|--------|---------|-------------|
| 2019/0259108 | A1* | 8/2019 | Bongartz | A01G 31/02 |
| 2020/0082168 | A1  | 3/2020 | Fathi   |             |
| 2021/0158237 | A1* | 5/2021 | Atwater | G06Q 50/06  |
| 2022/0110248 | A1* | 4/2022 | Vandike | G01N 33/0098 |

OTHER PUBLICATIONS

Buonocore, et al.: "A Proposal for a Forest Digital Twin Framework and Its Perspectives": Mar. 22, 2022 [online], [retrieved on Nov. 27, 2023]. Retrieved from the internet @ https://www.mdpi.com/1999-4907/13/4/498; pp. 1-19, esp pp. 2-15, fig. 1.

Li, et al.: "Classigication of Tree Species Based on Structural Features Derived From High Density LiDARE Date"; Nov. 17, 2012, [online], [retrieved on Nov. 27, 2023]. Retrieved from the internet @ https://www.academia.edu/12473483/Classification_of_tree_speciard_based_on_structural_features_derived_from_high_density_LiDAR_data; pp. 1-11, esp pp. 7-8.

WOISR (International Search Report & Written Opinion) mailed Feb. 22, 2024 for corresponding PCT/US23/33519.

* cited by examiner

REMOTE SENSING FOR INTELLIGENT VEGETATION TRIM PREDICTION

TECHNICAL FIELD

The present disclosure relates to remote sensing of vegetation and more particularly to systems and methods for implementing a three dimensional (3D) digital twin and vegetation model to predict vegetation growth.

BACKGROUND

A 3D scanner can be based on many different technologies, each with its own limitations, advantages and costs. Many limitations in the kind of objects that can be digitized are still present. For example, optical technology may encounter many difficulties with dark, shiny, reflective or transparent objects. For example, industrial computed tomography scanning, structured-light 3D scanners, LiDAR and Time of Flight 3D Scanners can be used to construct digital 3D models, without destructive testing.

SUMMARY

One example relates to a non-transitory computer readable medium storing a computer readable program that includes a remote sensing controller that stores a set of 3D data characterizing a utility asset and vegetation in a digital twin database. The digital twin database stores 3D data characterizing the utility asset and vegetation over time. The computable readable program further includes a biomass engine that classifies instances of vegetation characterized by the set 3D data stored in the digital twin database as a particular type of vegetation. The biomass engine further generates a growth curve for each instance of vegetation based on the set of 3D data stored in the digital twin database and the particular type of vegetation. Additionally, the biomass engine predicts future growth for each instance of vegetation based on the growth curve and determines if and when each instance of vegetation will exceed an encroachment threshold associated with the utility asset.

Another example relates to a system that includes a remote sensing controller that receives a set of 3D data of an environment from a remote sensing device and generates a digital twin of the environment based on the set of 3D data. The digital twin is a 3D representation of the environment including a utility asset and vegetation. The system also includes a digital twin database that stores the digital twin and parameters corresponding to the utility asset and vegetation. The system further includes a biomass engine that classifies instances of vegetation characterized by the digital twin stored in the digital twin database as a particular type of vegetation. The biomass engine further generates a growth curve for each instance of vegetation based digital twin stored in the digital twin database and the particular type of vegetation. Additionally, the biomass engine can predict future growth for each instance of vegetation based on the growth curve and predict if and when each instance of vegetation will exceed an encroachment threshold associated with the utility asset.

Still another example relates to a method that can include receiving, by a remote sensing controller executing on a computing platform, a set of 3D data from a remote sensing device that characterizes an environment including utility assets and vegetation. The method can further include generating, by the remote sensing controller, a digital twin of the environment using the set of 3D data, the digital twin being a 3D representation of the environment. The method can further include storing, by the remote sensing controller, the digital twin in a digital twin database, digital twin database storing parameters corresponding to utility assets and vegetation of the environment. Additionally, the method can include receiving, by the remote sensing controller, another set of 3D data from the remote sensing device that characterizes the environment. Further, the method can include updating, by the remote sensing controller, the digital twin stored in the digital twin database using the another set of 3D data. Furthermore, the method can include classifying, by a biomass engine executing on the computing platform, each instance of vegetation characterized by the digital twin stored in the digital twin database as a particular type of vegetation. Further still, the method can include determining, by the biomass engine, a distance to utility assets of each instance of vegetation based on the digital twin. Also, the method can include storing, by the biomass engine, the classifications and distances to utility assets of each instance of vegetation as parameters corresponding to the instances of vegetation in the digital twin database. The method can also include generating, by the biomass engine, a growth curve for each instance of vegetation based on the digital twin and parameters corresponding to the instance of vegetation stored in the digital twin database. Moreover, the method can include predicting, by the biomass engine, a volume, density, and distance to the utility asset of each instance of the vegetation at a future time based on the growth curve.

DETAILED DESCRIPTION

The present disclosure relates to a remote sensing system that employs remote sensing to locate and classify objects in and around utility assets such as poles and wires. The remote sensing system can include Light Detection and Ranging (LiDAR), Aerial and Satellite photography, Multispectral, Hyperspectral, and Radar. Accordingly, the remote sensing is employed to generate a digital twin that includes utility assets. As used herein, the term "digital twin" refers to a three dimensional (3D) representation of an environment. Parameters corresponding to the utility assets can be identified in the digital twin, such as poles, wire locations, locations of vegetation, theoretical clearance distance, crew type and productivity, and priority. Using the parameters, a volumetric measure of tree clearing work and project manhours, as well as a cost associated with the work and manhours, can be calculated using the parameters.

Additionally, the remote sensing system can be employed over time (e.g., weeks or months) to monitor encroachment volume of previously identified vegetation. That is, vegetation that is identified via an initial LiDAR scan, such as a tree, is catalogued. Thus, the initial LiDAR scan of the tree establishes a baseline that is stored in a database (e.g., catalogued), such that future scans can be compared to the baseline. For example, a second LiDAR of the same tree can be employed to ensure that new data can be used to update the catalogue and be applied to the initial LiDAR scan for test change detection. Additionally or alternatively, another LiDAR scan be employed to establish a growth curve for the tree and apply test forecasting. That is, based on a series of scans, such as the initial scan and the second scan, the remote sensing system can predict when the tree will need to be trimmed to prevent encroachment into a vegetation clearance zone (e.g., proximal to an asset), as well as what methodology (e.g., crew time, productivity) will be necessary to trim the tree.

Moreover, the remote sensing system can be applied to a given tree as above, as well as a forest of trees. That is, the remote sensing system can identify, classify, and monitor each tree in a forest of trees or other grouping of vegetation. A given type of vegetation can have a growth curve different than another type of vegetation based on a variety of factors. For example, different types of trees or bushes may grow at a rate dependent on the type or species of vegetation, when the vegetation was last trimmed, or the age of the vegetation. Because the remote sensing system can be applied to each tree in a forest of trees, each tree in the forest of trees can be catalogued and monitored, such that a growth curve is calculate for each tree.

Figure 1:
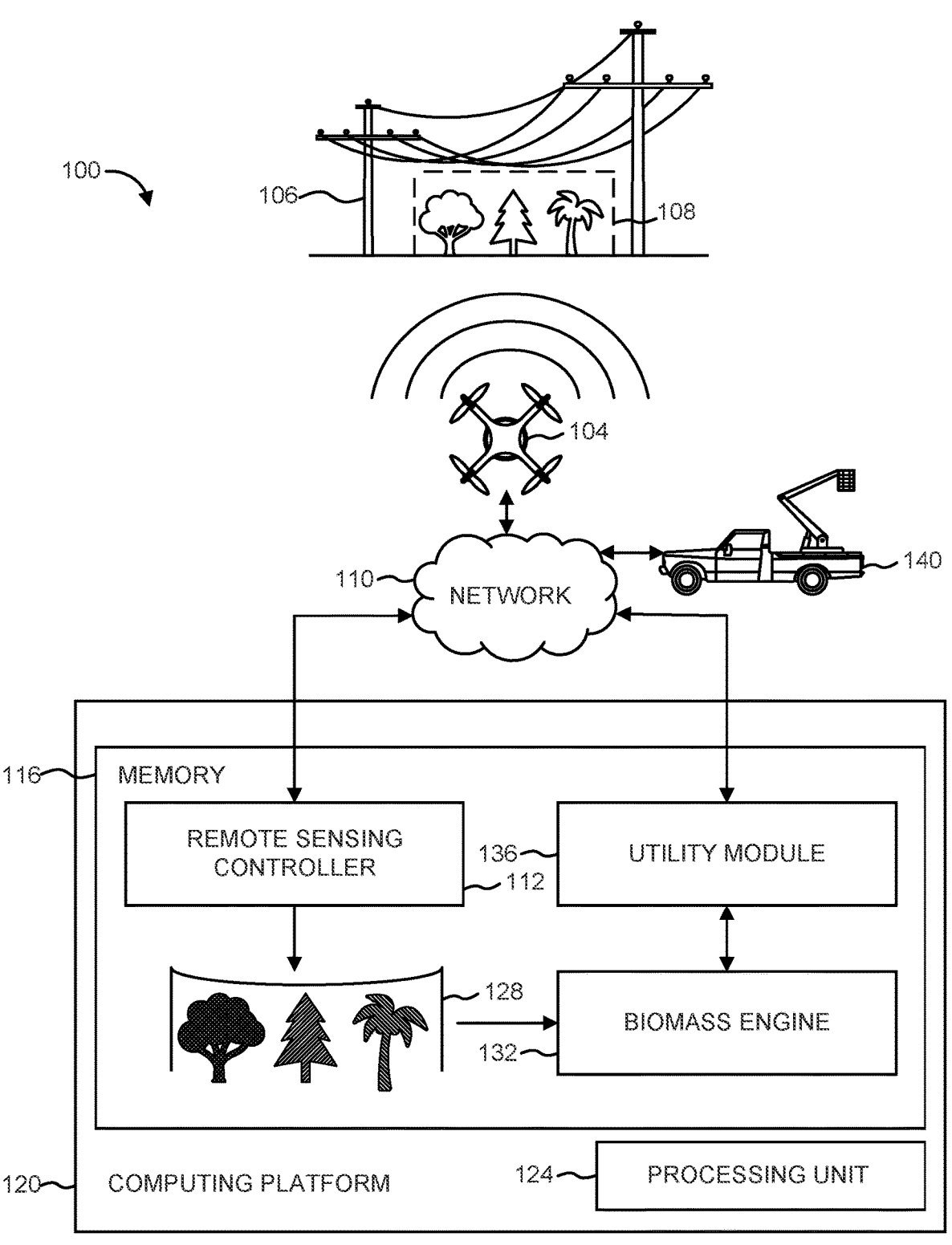
FIG. 1 illustrates an example of a remote sensing based intelligent vegetation trim prediction model system.

FIG. 1 illustrates a remote sensing based intelligent vegetation trim prediction model system 100. The system 100 can include a remote sensing device 104 that is employed to collect data about an environment. The remote sensing device 104 can be an unmanned aerial vehicle (UAV) or land vehicle equipped to perform Light Detection and Ranging (LiDAR). Additionally or alternatively, the remote sensing device 104 can be equipped to perform Aerial and Satellite photography, as well as Hyperspectral, Multispectral, and radar imaging. By employing LiDAR, the remote sensing device 104 can collect three dimensional (3D) data of an environment that includes utility assets 106 and vegetation 108. Utility assets 106 can be poles, wires, buildings, and equipment for power distribution. Vegetation can include different species of trees, bushes, and shrubs.

The remote sensing device 104 can be a wireless vehicle that can communicate over a network 110. The network 110 can be a point-to-point network, such as a cellular network or a Wi-Fi network. In examples where the network 110 is a cellular network, the cellular network can be implemented with a 3G network, a 4G Long-Term Evolution (LTE) network, a 5G network, etc. Accordingly, the remote sensing device 104 can provide the 3D data of an environment to a remote sensing controller 112 via the network. The remote sensing controller 112 can be stored in a memory 116 of a computing platform 120 that also includes a processing unit 124.

The remote sensing controller 112 can generate a digital twin, or a 3D representation of the environment scanned by the remote sensing device 104. Accordingly, the digital twin can include the utility assets 106 and vegetation 108 of the scanned environment. Because the 3D data of the environment can be collected using LiDAR, the 3D data can be further characterized as 3D point clouds. Particularly, the 3D data can be a collection of numerous data points received by a LiDAR sensor that spread throughout a 3D space. By combining the numerous data points of the 3D data, the remote sensing controller 112 can generate a digital twin of an environment sensed by the LiDAR sensors of the remote sensing device 104.

Additionally, by employing a LiDAR point cloud algorithm, the remote sensing controller 112 can apply a LiDAR point cloud algorithm to the digital twin to identify particular utility assets 106 and vegetation 108 of the environment. Because the digital twin is generated from a 3D data characterizing the environment, the digital twin includes volumes of LiDAR point clouds (e.g., height×width×length) that can be used to determine particular utility assets 106 and vegetation 108. Accordingly, the remote sensing controller 112 can identify utility assets 106 as poles and wires, as well as vegetation 108 as trees and bushes based on the volume of LiDAR point clouds of the digital twin. Furthermore, density of the LiDAR point clouds (e.g., quantity of points per volume) can be employed to determine a particular species of vegetation. That is, volume of a vegetation can be used to determine that a particular instance of vegetation is a tree, whereas density can be used to determine the species of the tree (e.g., conifer, palm, pine).

Figure 2A:
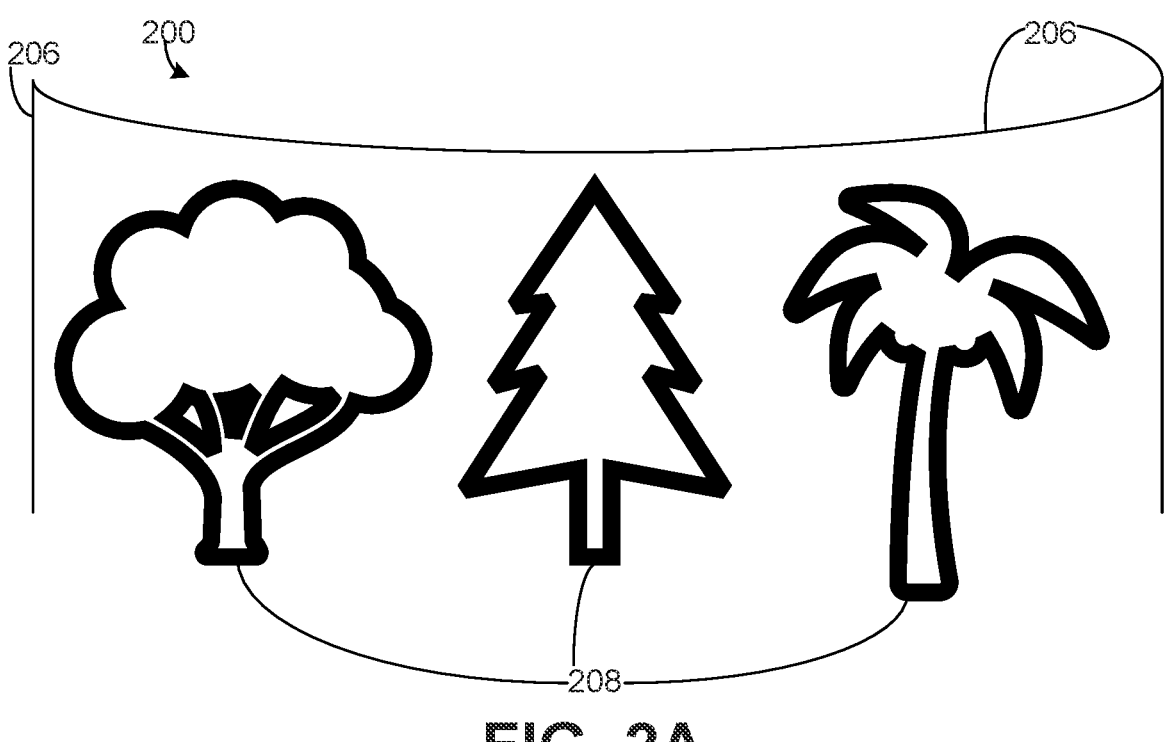
FIG. 2A illustrates an environment including vegetation and utility assets.

FIG. 2A illustrates an example of environment 200 including utility assets 206 and vegetation 208. The utility assets 206 of FIG. 2A can be the utility assets 106 of FIG. 1, and the vegetation of FIG. 2A can be the vegetation 108 of FIG. 1. As illustrated in FIG. 2A, the utility assets can include poles and wires. Additionally, the vegetation 208 can include different types of vegetation (e.g., trees, bushes, shrubs) and particular species of vegetation (e.g., conifer, palm, acer) as depicted in FIG. 2A.

Figure 2B:
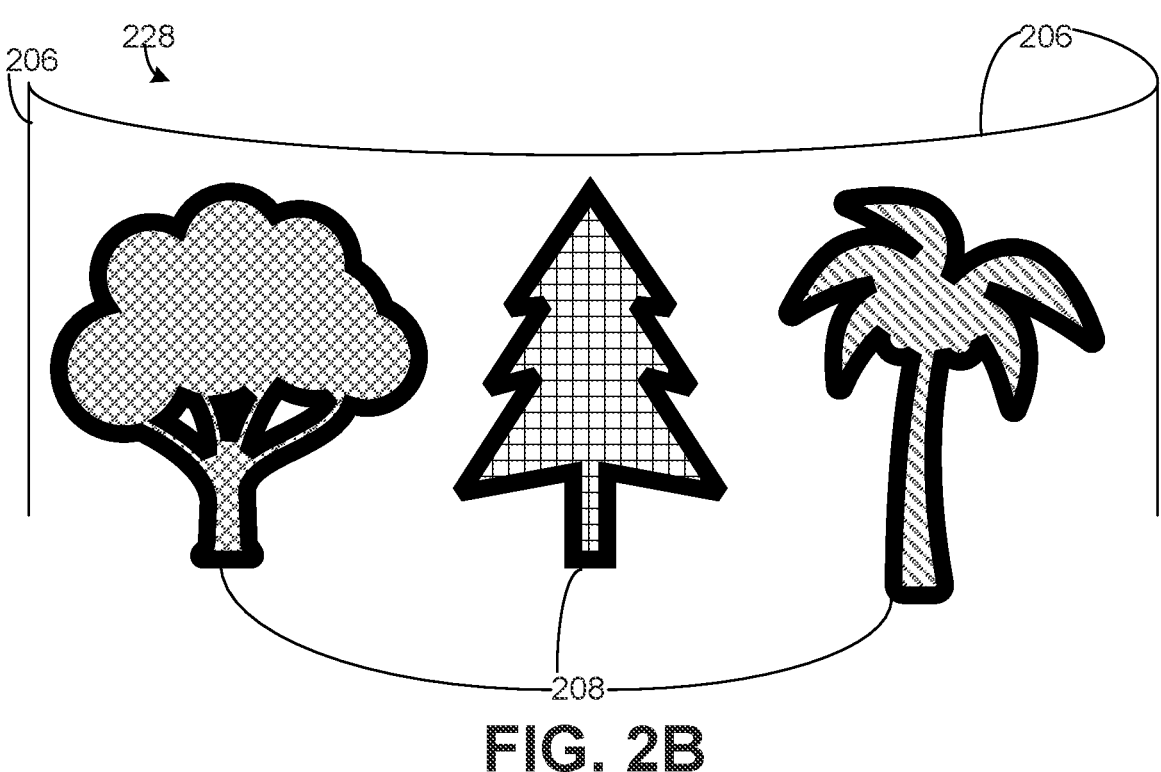
FIG. 2B illustrates a digital twin of the environment of FIG. 2A.

FIG. 2B illustrates an example of a digital twin 228 of the environment of FIG. 2A. The utility assets 206 of FIG. 2B can be a 3D representation of the utility assets 206 of FIG. 2A and the vegetation 208 of FIG. 2B can be a 3D representation of the vegetation 208 of FIG. 2A. As illustrated, both utility assets 206 and vegetation 208 can be identified in the digital twin 228. Particularly, the digital twin includes 3D representations of utility assets 206, such as poles and wires. The digital twin further includes 3D representations of vegetation 208, such as trees. Because the digital twin is generated using point clouds, the point clouds for vegetation 208 can be further classified by species. As illustrated in FIG. 2B, each particular tree identified in the digital twin 228 can be classified as a species, such as conifer, palm, and acer.

Referring back to FIG. 1, the remote sensing controller 112 can store the digital twin in a digital twin database 128. Additionally, the digital twin database 128 can store parameters associated with the 3D point clouds of the digital twin. That is, the digital twin database 128 can store parameters corresponding to utility assets 106 and vegetation 108 that are indicative of location, size, and relationships between utility assets 106 and vegetation 108. Parameters stored in the digital twin database 128 can include wire locations, locations of vegetation 108, theoretical clearance distance, distance from an instance of vegetation 108 to a utility asset 106, and a vegetation clearance zone can be stored in the digital twin database 128. Accordingly, parameters indicative of growth of vegetation 108 towards utility assets 106 are stored in the digital twin database 128.

Furthermore, the digital twin database 128 can be updated over time to represent changes in the scanned environment over time. Particularly, the remote sensing controller 112 can generate a digital twin using 3D data provided by the remote sensing device 104 in response to a first scan by the remote sensing device 104. Further, the remote sensing controller 112 can update the digital twin stored in the digital twin database 128 using 3D data provided by the remote sensing device 104 in response to a second scan by the remote sensing device 104. Accordingly, the digital twin and associated parameters stored in the digital twin database 128 can continuously be updated by the remote sensing controller 112 using 3D data characterizing the environment provided by the remote sensing device 104.

The digital twin database 128 can provide the digital twin and corresponding parameters to a biomass engine 132. In response to receiving the digital twin and corresponding parameters, the biomass engine 132 can generate a growth curve for vegetation 108 in the digital twin based on the vegetation 108 identified and parameters corresponding to the vegetation 108. Because the digital twin can identify volumes (e.g., height×length×width) of vegetation 108 over time, a rate of growth can be modeled by the biomass engine 132 based on the changes in volume of the vegetation 108. Additionally, because the digital twin can identify particular species of vegetation 108, the biomass engine 132 can more accurately predict growth of vegetation 108 based on the species of vegetation 108. Furthermore, parameters such as time of last trim stored in the digital twin database 128 affect a growth rate of vegetation 108, which can be incorporated into the growth curve of vegetation by the biomass engine 132.

Figure 3A:
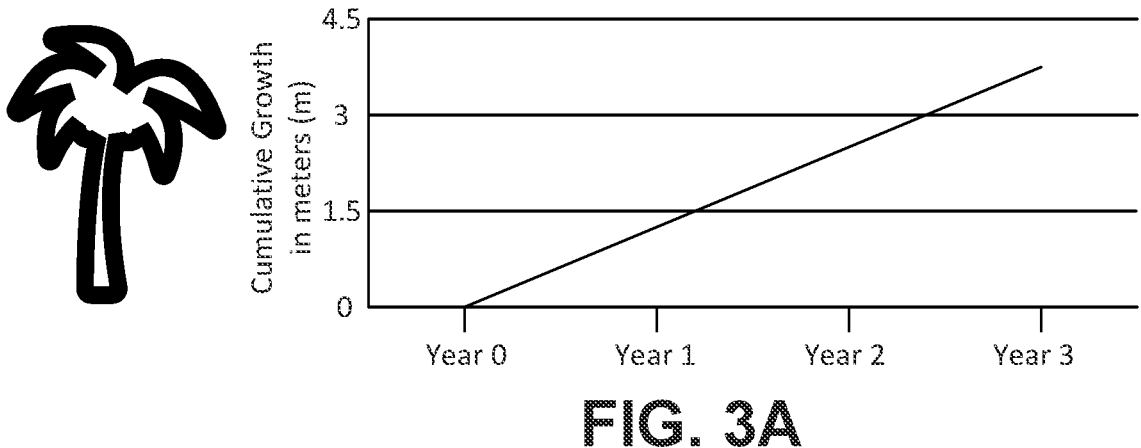
FIGS. 3A-3C each illustrate example growth curves for different types of vegetation.
Figure 3B:
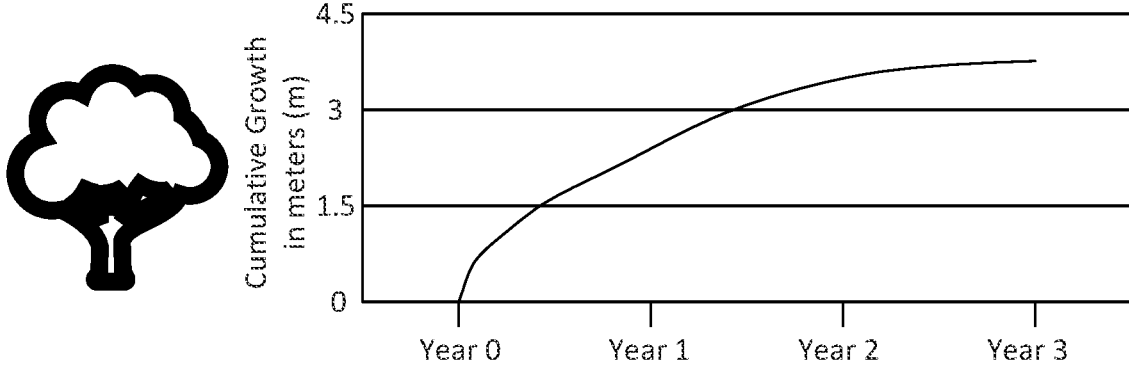
Figure 3C:
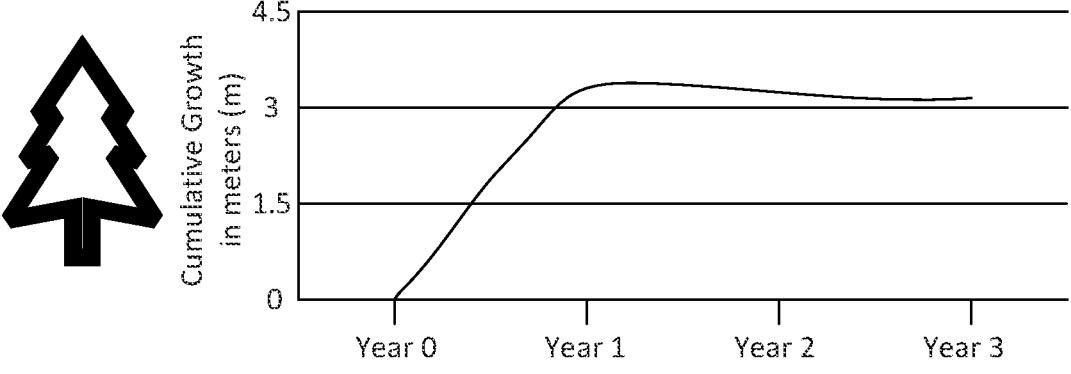

FIGS. 3A-C illustrate growth curves for different species of vegetation generated by a biomass engine, such as the biomass engine 132 of FIG. 1. Each of FIGS. 3A-C illustrate a growth curve over a three year period, which can be inferred from a digital twin generated by a remote sensing controller 112 of FIG. 1 in response to receiving 3D data from a remote sensing device 104 of FIG. 1 over multiple scans over time. Again, a digital twin database, such as the digital twin database 128 of FIG. 1 can store parameters associated with the vegetation, such as the species of vegetation and time of last trim. Accordingly, the biomass engine can generate an accurate growth curve for each identified vegetation.

For example, FIG. 3A illustrates a growth curve for a first tree. The first tree can be a palm tree. The growth curve generated by the biomass engine for the first tree is substantially linear, as illustrated in FIG. 3A. That is, it can be inferred that the first tree grows at about 1.5 meters per year. In another example, FIG. 3B illustrates a growth curve for a second tree, such that the second tree can be an acer tree. The growth curve generated by the biomass engine for the second tree has a logarithmic growth to about four meters. In another example, FIG. 3C illustrates a growth curve for a third tree, such that the third tree can be a conifer tree. The growth curve generated by the biomass engine for the third tree growths exponentially until it reaches about four meters at one year, but decays to about three meters in three years. Accordingly, the biomass engine can generate a growth curve for hundreds of identified vegetation, each growth curve being based on the digital twin updated for scans over time, as well as parameters associated with each identified vegetation.

Referring back to FIG. 1, the biomass engine 132 can generate thresholds of vegetation 108 growth in relation to utility assets 106. That is, the growth curves generated by the biomass engine 132 for vegetation 108 can be used by the biomass engine 132 to generate a vegetation encroachment threshold based on a location of a utility asset 106. Accordingly, the biomass engine 132 can determine when vegetation 108 growth extends beyond at encroachment threshold, such that the vegetation 108 needs to be trimmed to prevent damage to utility assets 106.

Figure 4:
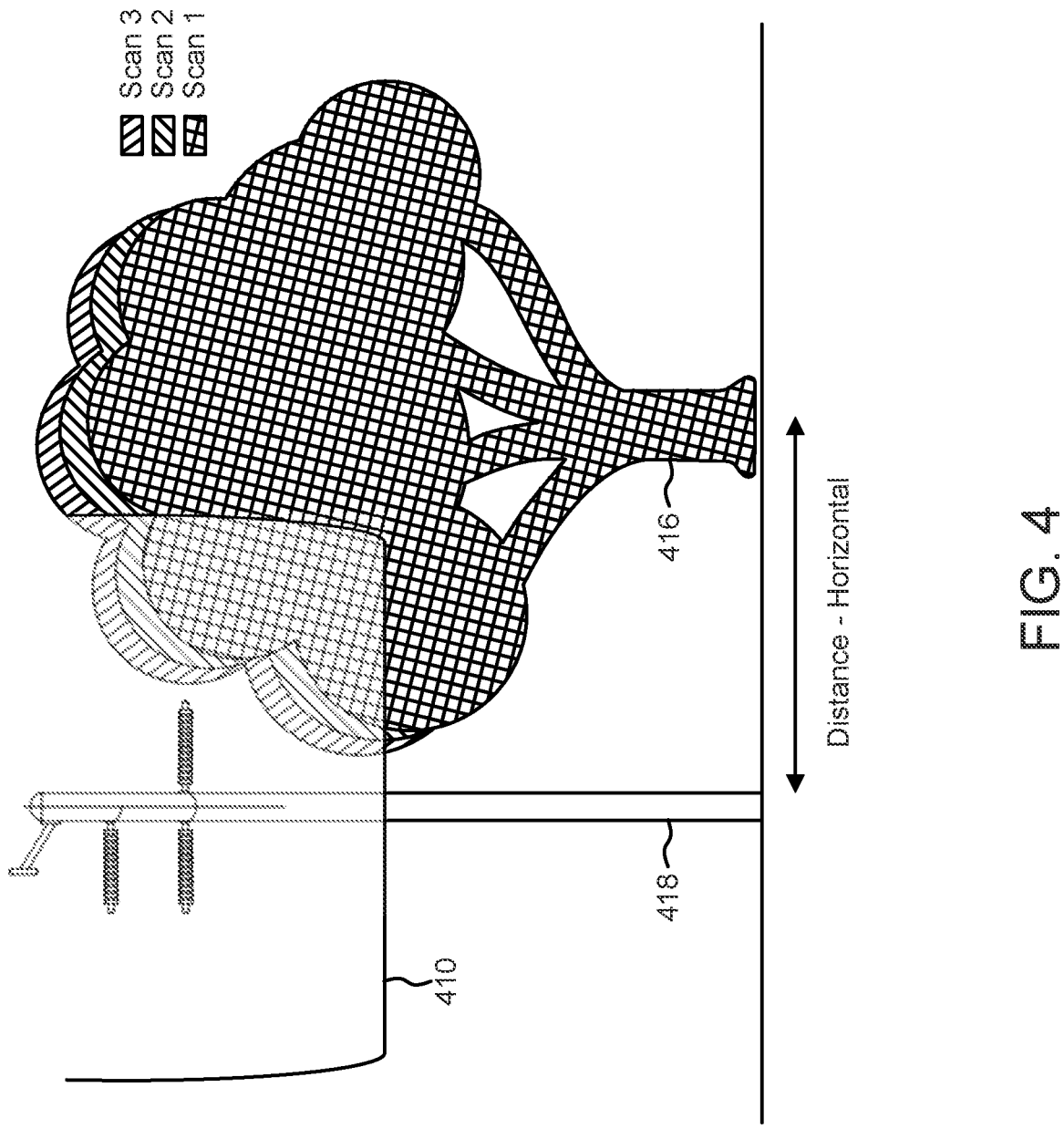
FIG. 4 illustrates an example of vegetation encroaching a utility asset over time.

FIG. 4 illustrates an example of an encroachment threshold 410 for a utility asset 416 in relation to vegetation 418. The vegetation 418 can be the vegetation 108 of FIG. 1 and the utility asset 416 can be the utility assets 106 of FIG. 1. As illustrated, the encroachment threshold 410 can be a volumetric area surrounding the utility asset 416. The utility asset 416 can be a pole and the vegetation 418 can be a tree of the conifer species. Additionally, different volumes of the vegetation 418 are shown in response to different scans. That is, the different volumes of the vegetation 418 can be a visualization of a growth curve generated by a biomass engine (e.g., the biomass engine 132 of FIG. 1) for the particular vegetation 418.

As shown in FIG. 4, each scan of the vegetation 418 encroaches further toward the utility asset 416. The first scan of the vegetation 418 has not passed the encroachment threshold. The second scan of the vegetation 418 is closer to the utility asset 416 than the first scan, but the second scan of vegetation 418 does not pass the encroachment threshold. The third scan does pass the encroachment threshold towards the utility asset 416. Accordingly, it can be determined by the biomass engine that the vegetation 418 needs to be trimmed to prevent encroachment into the utility asset 416 that can cause damage to the utility asset 416 before the vegetation 418 interferes with the operation of the utility asset 416.

Referring back to FIG. 1, the biomass engine 132 can also predict future vegetation 108 growth based on the digital twin and corresponding parameters stored in the digital twin database 128. Accordingly, the biomass engine 132 can predict a future time when vegetation 108 will encroach a utility asset 106. Because the biomass engine 132 can generate a growth curve for vegetation 108, which can be applied to the digital twin (e.g., 3D representation), the biomass engine 132 can predict when the vegetation 108 will pass an encroachment threshold associated with a given utility asset 106.

Figure 5:
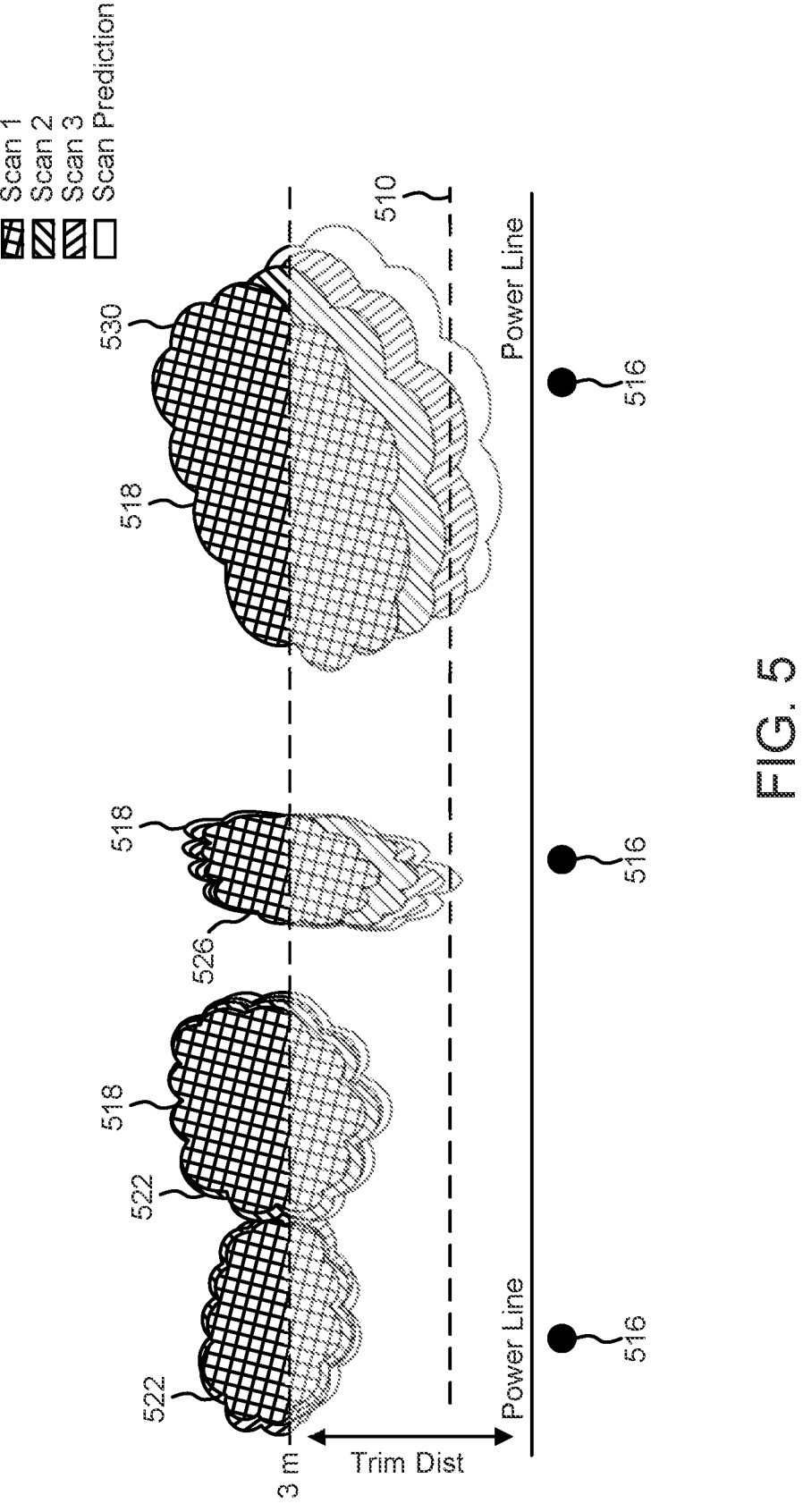
FIG. 5 illustrates examples of vegetation encroaching a utility asset over time, prediction of vegetation growth based on vegetation growth curves, and a threshold of vegetation encroachment.

FIG. 5 illustrates another example of an encroachment threshold 510 for a utility asset 516 in relation to vegetation 518. The vegetation 518 can be the vegetation 108 of FIG. 1 and the utility asset 516 can be the utility assets 106 of FIG. 1. Again, FIG. 5 illustrates various instances of vegetation 518, as well as different volumes of instances of vegetation 518 corresponding to scans by a remote sensing device (e.g., remote sensing device 104 of FIG. 1) of the vegetation 518 over time. Additionally, FIG. 5 illustrates a predicted scan based on growth curve for each vegetation 518 at a future time.

A first instance of vegetation 522 is centered at a trim distance of about 3 meters from the utility assets 516. Additionally, the first instance of vegetation 522 is shown to have three scans and a predicted scan at a future time. Each scan of the first instance of vegetation 522 does not extend passed the encroachment threshold 510. Rather, the predicted scan extends to about 1.5 meters from the utility asset. Accordingly, a biomass engine (e.g., the biomass engine 132 of FIG. 1) can determine that the first instance of vegetation 522 will need to be trimmed in two years.

A second instance of vegetation 526 is also centered at a trim distance of about 10 meters from the utility asset 516. Accordingly, each of the three scans do not extend beyond the encroachment threshold 510. However, the three scans illustrate that the second instance of vegetation 526 is growing at a higher rate than the first instance of vegetation 522, such that the third scan of the second instance of vegetation 526 is nearly at a trim distance of about 1.2 meters from the utility assets 516. Additionally, the predicted scan of the second instance of vegetation 526 does reach the encroachment threshold 510. Accordingly, the biomass engine can determine that the second instance of vegetation 526 needs to be trimmed soon (e.g., less than one year).

A third instance of vegetation 530 is also centered at a trim distance of about 3 meters from the utility asset 516. Here, the third instance of vegetation 530 is illustrated as the largest instance of vegetation 518. Additionally, the first two scans of the third instance of vegetation 530 do not pass the encroachment threshold 510. However, the third scan of the third instance vegetation 530 does pass the encroachment threshold 510, such that the predicted scan for a future time is about 0.3 meter away from the utility asset 516. Accordingly, the biomass engine can determine that the third instance of vegetation 530 needs to be trimmed soon (e.g., less than one year) or immediately.

Referring back to FIG. 1, the biomass engine 132 can provide a utility module 136 with the prediction of when the vegetation 108 needs to be trimmed. The utility module 136 can store or obtain information related to maintenance of utility asset 108, including trimming operations of vegetation 108. Particularly, the utility module 136 can generate work orders for utility crews to perform trimming operations of vegetation 108. The utility module 136 can also determine specific trimming operations for identified vegetation based on species. For example, a conifer tree is denser than a palm tree because conifer trees can have more branches, thicker leaves, and cones. Accordingly, the utility module 136 can determine specific trimming operations based on the growth curve of the vegetation 108 and a particular species of the vegetation 108. Because the utility module 136 can obtain information related to maintenance of utility assets 106, the utility module 136 can also predict a cost associated with specific operations based on equipment and man hours needed to remove the vegetation 108.

The utility module 136 can also communicate with the network 110 to provide a remote utility device 140 with a work order to complete the specific trimming operations. The remote utility device 140 can be a computing device, such as a smart phone or tablet computer deployed with a service crew. Accordingly, the service crew can use the remote utility device 140 to receive instructions of a specific trimming operation. Additionally, the utility module 136 can determine which service crews are available and which service crews are deployed, such that the utility module 136 can efficiently deploy service crews.

Furthermore, the utility module 136 can associate cost parameters with specific trimming operations based on parameters corresponding to the vegetation 108. That is, crew type and productivity, as well as priority, can be used to create a volumetric measure of vegetation 108 clearing work, as well as manhours and cost. Accordingly, these cost parameters can be tracked in response to work orders executed by a service crew. Therefore, by tracking costs associated with trimming and/or clearing particular types of vegetation 108, it can be accurately predicted how much specific trimming operations by a given service crew will cost.

Figure 6:
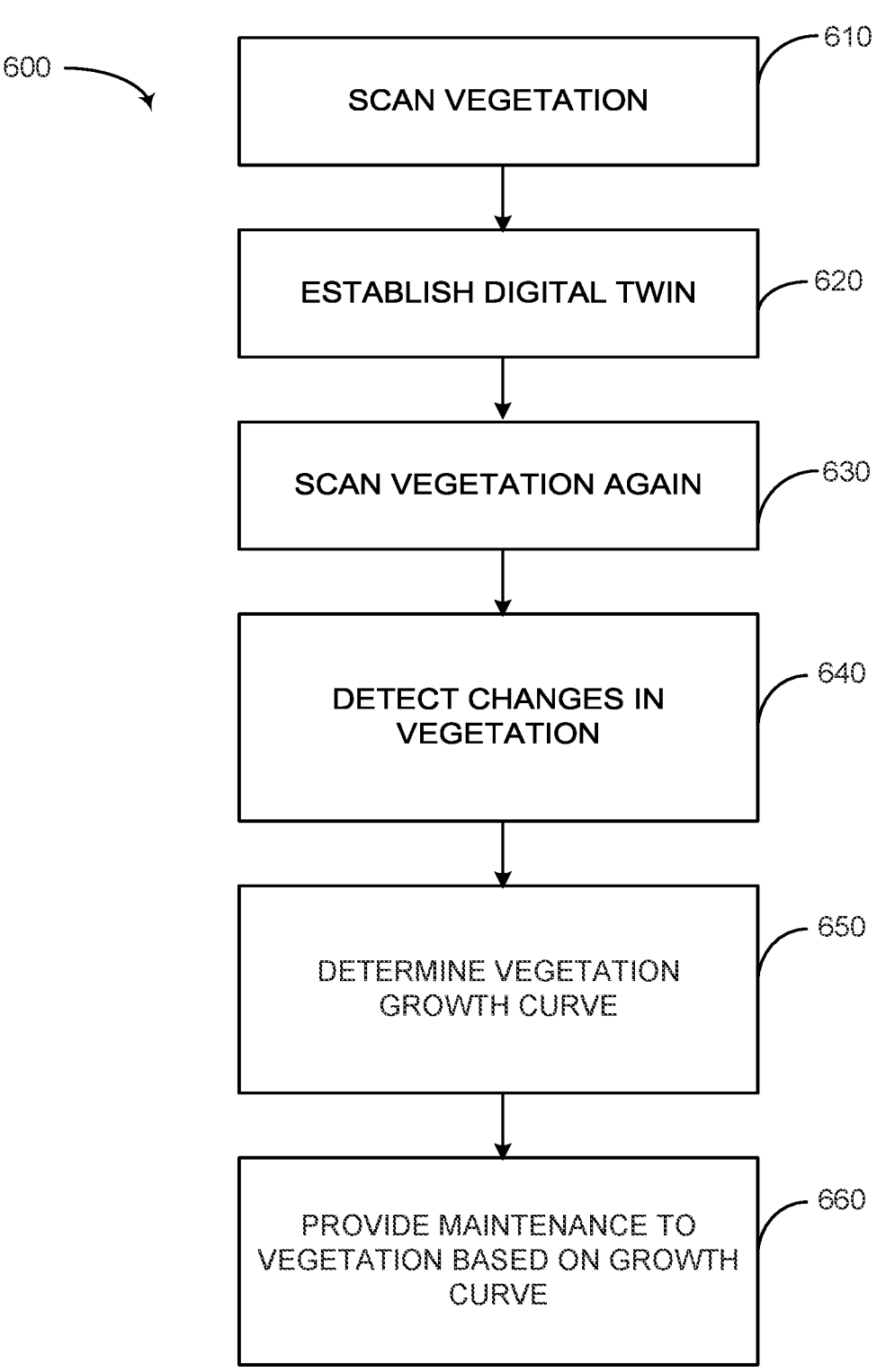
FIG. 6 illustrates a flowchart of an example method for employing a digital twin to predict vegetation growth and maintain vegetation based on vegetation growth.

In view of the foregoing structural and functional features described above, an example method will be better appreciated with reference to FIG. 6. While, for purposes of simplicity of explanation, the example method of FIG. 6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 6 illustrates a flowchart of an example method for employing a digital twin to predict vegetation growth and maintain vegetation based on vegetation growth. At 610, an environment is scanned by a remote sensing device, such as the remote sensing device 104 of FIG. 1. In response to scanning the environment, the remote sensing device collects 3D data characterizing the environment, including utility assets (e.g., utility assets 106 of FIG. 1) and vegetation (e.g., vegetation 108 of FIG. 1). At 620, a digital twin of the environment, including the vegetation and utility assets, is generated using the 3D data collected by the remote sensing device.

At 630, the remote sensing device scans the environment again. Accordingly, the digital twin is updated based on the 3D data collected by the remote sensing device. At 640, changes in the environment can be detected based on the differences in the initial scan at 610 and the following scan at 630. Therefore, differences in volumes and density of vegetation can be identified in the digital twin. At 650, the differences in volume and vegetation of the vegetation are employed to determine a vegetation growth curve. At 660, a maintenance crew can be provided instructions to trim the vegetation based on the determination of the growth curve.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed:

1. A non-transitory computer readable medium storing a computer readable program comprising:

a remote sensing controller that includes machine executable instructions that cause a processor to execute operations including:

receiving a set of 3D data from a remote sensing device and generating a digital twin of an environment based on the set of 3D data, the digital twin being a 3D representation of the environment including utility assets and vegetation, wherein the remote sensing controller applies a point cloud algorithm to identify particular utility assets and vegetation based on volumes of point clouds in the digital twin; and storing the set of 3D data characterizing a utility asset and vegetation in a digital twin database that stores 3D data characterizing the utility asset and vegetation over time; and a biomass engine that includes machine executable instructions that cause the processor to execute operations including:

classifying instances of vegetation characterized by the set of 3D data stored in the digital twin database as a particular type of vegetation, wherein each instance of the vegetation is a single plant, and the classifying is based on the volumes from the point clouds to identify particular species of vegetation;

generating a growth curve for each instance of vegetation based on the set of 3D data for a corresponding instance of vegetation stored in the digital twin database and the particular type of vegetation, wherein the growth curve is generated by analyzing changes in volume and density of the instance of vegetation over time as captured through multiple scans stored in the digital twin database, and each species of vegetation has one of linear growth, logarithmic growth or exponential growth; and predicting future growth for each instance of vegetation based on the growth curve and predicting if and when each instance of vegetation will exceed an encroachment threshold associated with the utility asset, wherein the predicting includes determining a future distance between the instance of vegetation and the utility asset based on the growth curve and 3D spatial relationships stored in the digital twin database, and wherein a volume and density of each instance of the vegetation at a future time is predicted by the biomass engine based on the growth curve.

2. The medium of claim 1, wherein the growth curve is updated in response to the remote sensing controller receiving another set of 3D data characterizing the utility asset and vegetation.

3. The medium of claim 2, the computer readable program further comprising a utility module that includes machine executable instructions that cause the processor to execute operations including providing a work order to a remote utility device to trim a given instance of vegetation based on the growth curve, particular type of vegetation, and distance to the utility asset of the given instance of vegetation.

4. The medium of claim 3, wherein the digital twin database stores parameters corresponding to each instance of vegetation and utility assets and the utility module provides specific trimming operations to trim the given instance of vegetation based on the parameters corresponding to the given instance of vegetation and utility asset.

5. The medium of claim 3, wherein the utility module provides the work order in response to the biomass engine determining that the distance to the utility asset of the given instance of vegetation exceeds the encroachment threshold corresponding to the utility asset.

6. The medium of claim 5, wherein the utility module provides the work order in response to the biomass engine determining that the predicted distance to the utility asset of the given instance of vegetation exceeds the encroachment threshold corresponding to the utility asset.

7. The medium of claim 6, wherein the sets of 3D data are a light detection and ranging (LiDAR) point cloud.

8. The medium of claim 1, wherein at least two instances of vegetation have different growth curves.

9. A system comprising:

a non-transitory memory that stores machine readable instructions; and a processing unit that accesses the memory and executes the machine readable instructions, the machine readable instructions comprising:

a remote sensing controller that includes machine executable instructions that cause a processor to execute operations including receiving a set of 3D data of an environment from a remote sensing device and generating a digital twin of the environment based on the set of 3D data, the digital twin being a 3D representation of the environment including a utility asset and vegetation, wherein the remote sensing controller applies a point cloud algorithm to identify particular utility assets and vegetation based on volumes of point clouds in the digital twin; and;

a digital twin database that stores the digital twin and parameters corresponding to the utility asset and vegetation; and a biomass engine that includes machine executable instructions that cause the processor to execute operations including:

classifying instances of vegetation characterized by the digital twin stored in the digital twin database as a particular type of vegetation, wherein each instance of the vegetation is a single plant, and the classifying is based on the volumes from the point clouds to identify particular species of vegetation;

generating a growth curve for each instance of vegetation based on the digital twin for the corresponding instance of vegetation stored in the digital twin database and the particular type of vegetation, wherein the growth curve is generated by analyzing changes in volume and density of the instance of vegetation over time as captured through multiple scans stored in the digital twin database, and each species of vegetation has one of linear growth, logarithmic growth or exponential growth; and predicting future growth for each instance of vegetation based on the growth curve and predicts if and when each instance of vegetation will exceed an encroachment threshold associated with the utility asset, wherein the predicting includes determining a future distance between the instance of vegetation and the utility asset based on the growth curve and 3D spatial relationships stored in the digital twin database, and wherein a volume and density of each instance of the vegetation at a future time is predicted by the biomass engine based on the growth curve.

10. The system of claim 9, wherein the growth curve is updated in response to the remote sensing controller receiving another set of 3D data characterizing the utility asset and vegetation.

11. The system of claim 10, further comprising a utility module that includes machine executable instructions that cause the processor to execute operations including providing a work order to a remote utility device to trim a given instance of vegetation based on the growth curve, the particular type of vegetation, and a distance to the utility asset of the given instance of vegetation.

12. The system of claim 11, wherein the utility module provides the work order in response to the biomass engine determining that the predicted distance to the utility asset of the given instance of vegetation exceeds the encroachment threshold corresponding to the utility asset.

13. The system of claim 12, wherein the digital twin database stores parameters corresponding to each instance of vegetation and utility assets and the utility module provides specific trimming operations to trim the given instance of vegetation based on the parameters corresponding to the given instance of vegetation and utility asset, the parameters corresponding to each instance of vegetation including the particular type of vegetation.

14. A method comprising:

receiving, by a remote sensing controller executing on a computing platform comprising a non-transitory memory and a processor, a set of 3D data from a remote sensing device that characterizes an environment including utility assets and vegetation;

generating, by the remote sensing controller, a digital twin of the environment using the set of 3D data, the digital twin being a 3D representation of the environment including the utility assets and vegetation, wherein the remote sensing controller applies a point cloud algorithm to identify particular utility assets and vegetation based on volumes of point clouds in the digital twin; and;

storing, by the remote sensing controller, the set of 3D data and the digital twin in a digital twin database, digital twin database storing parameters corresponding to utility assets and vegetation of the environment;

receiving, by the remote sensing controller, another set of 3D data from the remote sensing device that characterizes the environment;

updating, by the remote sensing controller, the digital twin stored in the digital twin database using the another set of 3D data;

classifying, by a biomass engine executing on the computing platform comprising the non-transitory memory and the processor, each instance of vegetation characterized by the digital twin stored in the digital twin database as a particular type of vegetation, wherein each instance of the vegetation is a single plant, and the classifying is based on the volumes from the point clouds to identify particular species of vegetation;

determining, by the biomass engine, a distance to utility assets of each instance of vegetation based on the digital twin;

storing, by the biomass engine, the classifications and distances to utility assets of each instance of vegetation as parameters corresponding to the instances of vegetation in the digital twin database;

generating, by the biomass engine, a growth curve for each instance of vegetation based on the digital twin and parameters for the corresponding instance of vegetation stored in the digital twin database, wherein the growth curve is generated by analyzing changes in volume and density of the instance of vegetation over time as captured through multiple scans stored in the digital twin database, and each species of vegetation has one of linear growth, logarithmic growth or exponential growth; and predicting, by the biomass engine, if and when each instance of vegetation will exceed an encroachment threshold associated with the utility asset, wherein the predicting includes determining a future distance between the instance of vegetation and the utility asset based on the growth curve and 3D spatial relationships stored in the digital twin database, and a volume and density of each instance of the vegetation at a future time based on the growth curve.

15. The method of claim 14, further comprising providing, by a utility module executing on the computing platform comprising the non-transitory memory and the processor, a work order to a remote utility device to perform trimming operations on a given instance of vegetation in response to the distance to utility assets parameter of the given instance of vegetation exceeding an encroachment threshold corresponding to a given utility asset, wherein a specific trimming operation is selected by the utility module based on the classification of the given instance of vegetation.

16. The method of claim 15, wherein the utility module provides the work order in response to the biomass engine determining that the predicted distance to the utility asset of the given instance of vegetation exceeds the encroachment threshold corresponding to the utility asset.

* * * * *